(12) United States Patent
Tonegawa et al.

(10) Patent No.: US 8,968,594 B2
(45) Date of Patent: Mar. 3, 2015

(54) PRODUCTION METHOD OF POSITIVE ELECTRODE ACTIVE MATERIAL FOR LITHIUM SECONDARY BATTERY

(71) Applicant: Showa Denko K.K., Minato-ku, Tokyo (JP)

(72) Inventors: Akihisa Tonegawa, Yokohama (JP); Akihiko Shirakawa, Chiba (JP); Isao Kabe, Yokohama (JP); Gaku Oriji, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 14/223,344

(22) Filed: Mar. 24, 2014

(65) Prior Publication Data
US 2014/0203218 A1    Jul. 24, 2014

Related U.S. Application Data

(63) Continuation of application No. PCT/JP2012/074515, filed on Sep. 25, 2012.

(30) Foreign Application Priority Data

Sep. 30, 2011    (JP) .................................. 2011-216464

(51) Int. Cl.
*H01M 4/88*    (2006.01)
*C01B 25/45*    (2006.01)
(Continued)

(52) U.S. Cl.
CPC ............. *C01B 25/45* (2013.01); *H01M 4/0402* (2013.01); *H01M 4/0471* (2013.01); *H01M 4/366* (2013.01); *H01M 4/5825* (2013.01); *H01M 4/1397* (2013.01)
USPC ...................... 252/182.1; 252/521.2; 423/179; 423/306; 429/211; 429/221

(58) Field of Classification Search
CPC .................................. C01B 25/45; H01M 4/04
USPC .................... 252/182.1, 521.2; 429/211, 221; 423/179, 306
See application file for complete search history.

(56) References Cited

U.S. PATENT DOCUMENTS

2007/0054187 A1    3/2007    Nuspl et al.
2009/0117022 A1    5/2009    Nuspl et al.

FOREIGN PATENT DOCUMENTS

CN    101142138 A    3/2008
CN    101891180 A    11/2010
(Continued)

OTHER PUBLICATIONS

Haisheng Fang, et al., "Hydrothermal Synthesis of Electrochemically Active LiMnPO4", Chemistry Letters, 2007, pp. 436-437, vol. 36, No. 3.

(Continued)

*Primary Examiner* — Khanh Tuan Nguyen
(74) *Attorney, Agent, or Firm* — Sughrue Mion, PLLC

(57) ABSTRACT

A method is employed for producing a positive electrode active material for a lithium secondary battery that comprises mixing lithium phosphate having a particle diameter $D_{90}$ of 100 μm or less, an M element-containing compound having a particle diameter $D_{90}$ of 100 μm or less (where, M is one type or two or more types of elements selected from the group consisting of Mg, Ca, Fe, Mn, Ni, Co, Zn, Ge, Cu, Cr, Ti, Sr, Ba, Sc, Y, Al, Ga, In, Si, B and rare earth elements) and water, adjusting the concentration of the M element with respect to water to 4 moles/L or more to obtain a raw material, and producing olivine-type $LiMPO_4$ by carrying out hydrothermal synthesis using the raw material.

15 Claims, 2 Drawing Sheets

(51) Int. Cl.
*H01M 4/04* (2006.01)
*H01M 4/36* (2006.01)
*H01M 4/58* (2010.01)
*H01M 4/1397* (2010.01)

(56) References Cited

FOREIGN PATENT DOCUMENTS

| DE | 103 53 266 A1 | 6/2005 |
|---|---|---|
| JP | 2006-261060 A | 9/2006 |
| JP | 2007-103298 A | 4/2007 |
| JP | 2007-511458 A | 5/2007 |
| JP | 2008-184346 A | 8/2008 |
| JP | 2010-95432 A | 4/2010 |
| JP | 2010-168230 A | 8/2010 |
| JP | 2011-71018 A | 4/2011 |
| JP | 2011-181452 A | 9/2011 |
| TW | 200523210 | 7/2005 |
| WO | 97/40541 A1 | 10/1997 |
| WO | 2005/051840 A1 | 6/2005 |
| WO | 2009/131095 A1 | 10/2009 |
| WO | 2013/024585 A1 | 2/2013 |

OTHER PUBLICATIONS

Nam-Hee Kwon, et al., "Enhanced Electrochemical Performance of Mesoparticulate LiMnPO4 for Lithium Ion Batteries", Electrochemical and Solid-State Letters, 2006, pp. A277-A280, vol. 9, No. 6.
International Search Report for PCT/JP2012/074515 dated Dec. 25, 2012.
Notice of Rejection for JP 2013-513310 dated Jul. 2, 2013.

PRODUCTION METHOD OF POSITIVE ELECTRODE ACTIVE MATERIAL FOR LITHIUM SECONDARY BATTERY

TECHNICAL FIELD

The present invention relates to a method for producing a positive electrode active material for a lithium secondary battery.

This application is a continuation application based on a PCT Patent Application No. PCT/JP2012/074515, filed Sep. 25, 2012, whose priority is claimed on Japanese Patent Application No. 2011-216464, filed Sep. 30, 2011. The contents of both the PCT application and the Japanese Patent Application are incorporated herein by reference.

BACKGROUND ART $LiMPO_4$ (wherein, M represents a metal such as Fe or Mn), which is an olivine-type of lithium metal phosphate, is less expensive than $LiCoO_2$, which has conventionally been widely used as a positive electrode active material of lithium secondary batteries. This material is expected to be used in the future as a positive electrode active material of lithium secondary batteries, and particularly large-sized lithium secondary batteries for automotive use.

As described in the prior art documents indicated below, known examples of methods used to produce $LiMPO_4$ include solid-phase synthesis, hydrothermal synthesis and sol-gel methods. Among these, hydrothermal synthesis is superior since it allows the obtaining of $LiMPO_4$ having a small particle diameter at a comparatively low temperature and in a short period of time.

In conventional methods used to carry out hydrothermal synthesis, lithium hydroxide, phosphoric acid and an M element-containing compound are mixed followed by the further addition of water to obtain a raw material, followed by carrying out hydrothermal synthesis by heating this raw material to a temperature of 100° C. or higher in an autoclave. At this time, the particle diameter of the $LiMPO_4$ decreases the smaller the amount of water present.

DOCUMENT OF RELATED ART PATENT DOCUMENTS

[Patent Document 1] International Publication No. WO 97/040541
[Patent Document 2] International Publication No. WO 05/051840

Non-Patent Documents

[Non-Patent Document 1] Chemistry Letters, 36 (2007), 436
[Non-Patent Document 2] Electrochemical and Solid-State Letters, 9 (2006), A277-A280

SUMMARY OF INVENTION

Technical Problem

In the case of conventional hydrothermal synthesis methods, however, in addition to the water added to the raw material, water also forms as a result of lithium hydroxide reacting with phosphoric acid during hydrothermal synthesis. When water is formed during hydrothermal synthesis, the amount of water increases as a result thereof and the reaction by which $LiMPO_4$ is formed is accelerated, thereby resulting in the problem of increased particle diameter of the $LiMPO_4$.

With the foregoing in view, an object of the present invention is to provide a method for producing a positive electrode active material for a lithium secondary battery that allows the obtaining of $LiMPO_4$ having a small particle diameter.

Solution to Problem

The following configurations are employed in order to solve the aforementioned problems.

[1] A method for producing a positive electrode active material for a lithium secondary battery, comprising: mixing lithium phosphate having a particle diameter $D_{90}$ of 100 μm or less, an M element-containing compound having a particle diameter $D_{90}$ of 100 μm or less (where, M is one type or two or more types of elements selected from the group consisting of Mg, Ca, Fe, Mn, Ni, Co, Zn, Ge, Cu, Cr, Ti, Sr, Ba, Sc, Y, Al, Ga, In, Si, B and rare earth elements) and water, adjusting the concentration of the M element with respect to water to 4 moles/L or more to obtain a raw material, and producing olivine-type $LiMPO_4$ by carrying out hydrothermal synthesis using the raw material.

[2] The method for producing a positive electrode active material for a lithium secondary battery described in [1], wherein the M element-containing compound is one type or two or more types of a sulfate, halide salt, nitrate, phosphate or organic salt of the M element.

[3] The method for producing a positive electrode active material for a lithium secondary battery described in [1] or [2], wherein one type or two or more types selected from the group consisting of LiOH, $Li_2CO_3$, $CH_3COOLi$ and $(COOLi)_2$ are further mixed in as a lithium source.

[4] The method for producing a positive electrode active material for a lithium secondary battery described in any of [1] to [3], wherein the lithium phosphate and the M element-containing compound are mixed after respectively adjusting to a particle diameter $D_{90}$ of 100 μm or less in an inert gas atmosphere.

[5] The method for producing a positive electrode active material for a lithium secondary battery described in any of [1] to [4], wherein the reaction temperature of hydrothermal synthesis is 100° C. or higher.

[6] A method for producing a positive electrode active material for a lithium secondary battery, comprising: mixing a carbon source with the $LiMPO_4$ obtained according to the production methods described in any of [1] to [5], and heating in an inert gas atmosphere or reducing gas atmosphere to form a carbon material on the surface of the $LiMPO_4$.

[7] The method for producing a positive electrode active material for a lithium secondary battery described in [6], wherein one or more types of sucrose, lactose, ascorbic acid, 1,6-hexanediol, polyethylene glycol, polyethylene oxide, carboxymethyl cellulose, carbon black and filamentous carbon are used as the carbon source.

Effects of the Invention

According to the present invention, a method for producing a positive electrode active material for a lithium secondary battery can be provided that allows the obtaining of $LiMPO_4$ having a small particle diameter.

DESCRIPTION OF EMBODIMENTS

Figure 1:
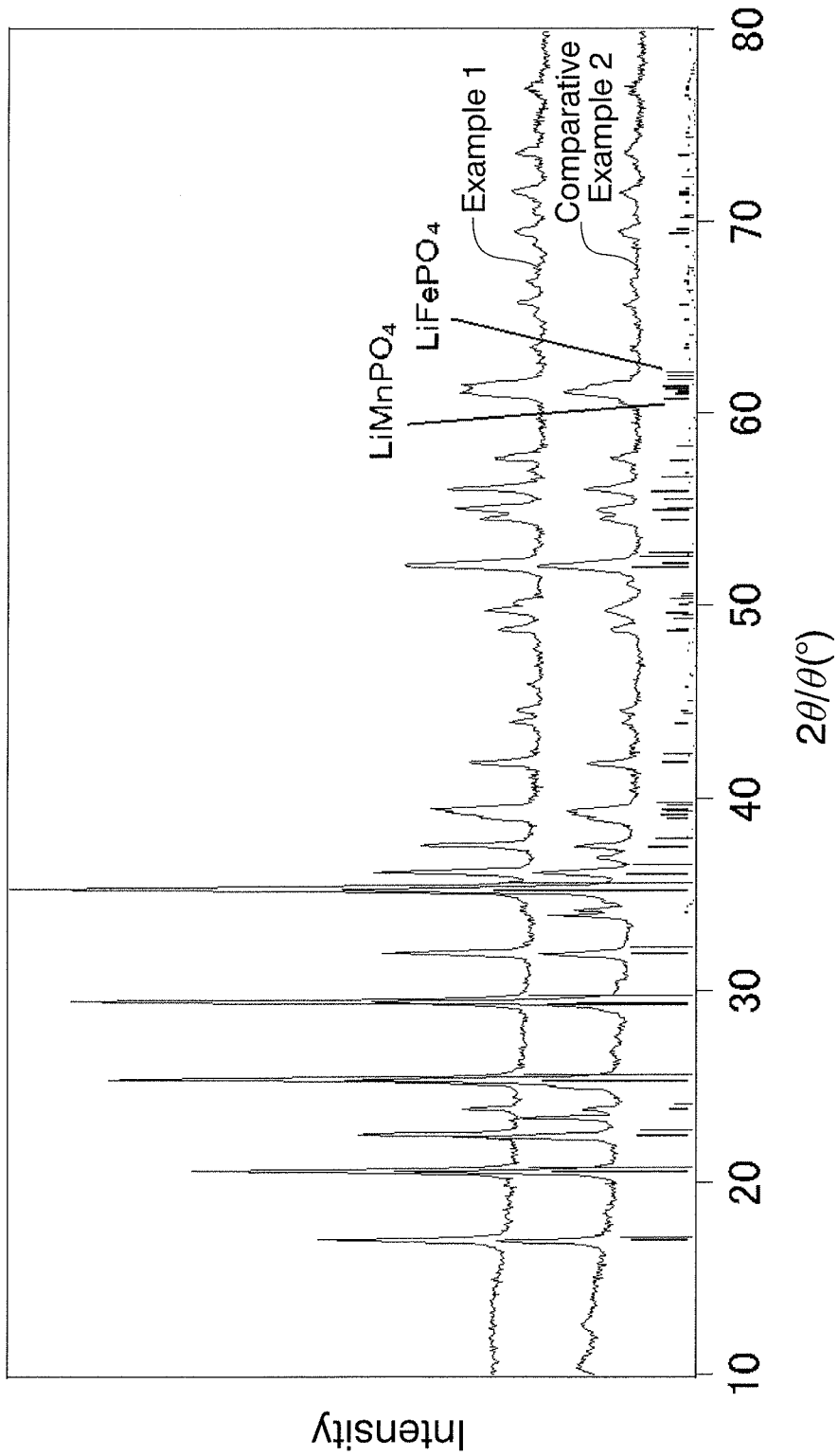
FIG. 1 depicts X-ray diffraction patterns of positive electrode active materials of Example 1 and Comparative Example 2.

The following provides an explanation of an embodiment of the present invention in the form of a method for producing a positive electrode active material for a secondary lithium battery with reference to the drawings.

In a preferred embodiment of the present invention in the form of a method of producing a positive electrode active material for a lithium secondary battery, as a result of using lithium phosphate for the Li source and phosphoric acid source when carrying out a hydrothermal synthesis reaction on olivine-type $LiMPO_4$ using an Li source, M source and phosphoric acid source as raw materials, in comparison with the case of using a conventional Li source such as lithium hydroxide or lithium carbonate, the secondary production of water during hydrothermal synthesis can be reduced, thereby making it possible to reduce the mean particle diameter of the $LiMPO_4$ by reducing the amount of water present during hydrothermal synthesis.

Moreover, although water is allowed to intervene in the reaction in order to carry out hydrothermal synthesis smoothly, the amount of water at this time is adjusted so as to be 4 moles/L or more as the concentration of the M element with respect to water. Here, water added to the raw materials and crystalline water of the M element-containing compound are included in the water contained in the raw materials. As a result of restricting the amount of water, the reaction by which $LiMPO_4$ is formed during hydrothermal synthesis can be suitably suppressed, thereby making it possible to further reduce the mean particle diameter of the $LiMPO_4$.

The olivine-type $LiMPO_4$ produced according to the production method in the preferred embodiment can be more specifically exemplified by a lithium metal phosphate salt having a composition consisting of $Li_xM_yP_wO_4$. Here, the letters x, y and w representing the molar ratios are such that $0<x<2$, $0<y\leq1.5$ and $0.9<w<1.1$, and M represents one type or two or more types of elements selected from the group consisting of Mg, Ca, Fe, Mn, Ni, Co, Zn, Ge, Cu, Cr, Ti, Sr, Ba, Sc, Y, Al, Ga, In, Si, B and rare earth elements.

The following provides an explanation of the details of this production method.

(Lithium Phosphate)

Lithium phosphate ($Li_3PO_4$) is an Li source and a phosphoric acid source. A powder having a particle diameter $D_{90}$ of 100 μm or less is used preferably, and a powder having a particle diameter $D_{90}$ of 45 μm or less is used more preferably. Particle diameter $D_{90}$ refers to the particle diameter at 90% on a particle size cumulative curve of particle size distribution of lithium phosphate powder. Particle size distribution is preferably measured by, for example, laser diffraction. Although the lower limit value of particle diameter $D_{90}$ can be set arbitrarily, it is typically 10 μm or more and more preferably 1 μm or more.

(M Source)

The M source is an M element-containing compound that melts during hydrothermal synthesis. Examples of M elements include one type or two or more types selected from the group consisting of Mg, Ca, Fe, Mn, Ni, Co, Zn, Ge, Cu, Cr Ti, Sr, Ba, Sc, Y, Al, Ga, In, Si, B and rare earth elements. Among these, divalent transition metals are particularly preferable, and examples of divalent transition metals include one type or two or more types of any of Fe, Mn, Ni or Co, while more preferable examples are Fe and/or Mn. Examples of M sources include sulfates, halides (such as chlorides, fluorides, bromides or iodides), nitrates, phosphates and salts of organic acids (such as oxalates or acetates). The M source is also preferably a compound that easily dissolves in the solvent used in the hydrothermal synthesis reaction. Among these, divalent transition metal sulfates are preferable, and iron (II) sulfate and/or manganese (II) sulfate as well as hydrates thereof are more preferable.

In addition, a powder having a particle diameter $D_{90}$ of 100 μm or less is preferably used for the M metal-containing compound, and a powder having a particle diameter $D_{90}$ of 60 μm or less is used more preferably. Although the lower limit value of particle diameter $D_{90}$ can be set arbitrarily, it is typically 30 μm or more and more preferably 10 μm or more.

The blending ratio of the lithium phosphate and M metal-containing compound is determined so as to coincide with the stoichiometric ratio of the lithium metal phosphate produced, and more specifically, lithium metal phosphate having a composition consisting of $Li_xM_yP_wO_4$. For example, in order to obtain $LiMPO_4$ in which $x=y=w=1$, the lithium phosphate and M metal-containing compound are blended such that the number of moles of phosphate ions contained in the lithium phosphate and the number of moles of M element contained in the M element-containing compound are equal. However, in the case by-products are able to be formed, lithium sources such as lithium contained in by-products are added.

In addition, a different Li source may also be added in addition to the lithium phosphate and M element-containing compound. The additional Li source is preferably a compound that melts during hydrothermal synthesis. Examples of thereof include one type or two or more types selected from the group consisting of LiOH, $Li_2CO_3$, $CH_3COOLi$ and $(COOLi)_2$. Among these, LiOH is preferable. Addition of such an Li source makes it possible to make the value of x in the composition ratio of $Li_xM_yP_wO_4$ to be 1 or more, thereby enhancing the discharge capacity of the positive electrode active material. A powder preferably having a particle diameter $D_{90}$ of 100 μm or less and more preferably 45 μm or less is used for the Li source in the same manner as the lithium phosphate. Although the lower limit value of particle diameter $D_{90}$ can be set arbitrarily, it is typically 10 μm or more and more preferably 10 μm or more.

Moreover, a phosphoric acid source such as phosphoric acid (orthophosphoric acid), metaphosphoric acid, pyrophosphoric acid, triphosphoric acid, tetraphosphoric acid, hydrogen phosphate, dihydrogen phosphate, ammonium phosphate, anhydrous ammonium phosphate, ammonium dihydrogen phosphate, diammonium hydrogen phosphate or iron phosphate may be added as a phosphoric acid source. A powder preferably having a particle diameter $D_{90}$ of 100 μm or less and more preferably 45 μm or less is used for the phosphoric acid source in the same manner as the lithium phosphate.

A lithium metal phosphate having a composition consisting of $Li_xM_yP_wO_4$ is obtained that has a small particle diameter provided the particle diameter $D_{90}$ of these raw materials is 100 μm or less.

In addition, although water is added to the raw materials in order to carry out hydrothermal synthesis smoothly, the amount of water added is adjusted so that the concentration of the M element with respect to water is 4 moles/L or more, preferably 4.5 moles/L or more, more preferably 4.7 moles/L or more, and even more preferably 4.9 moles/L or more. The amount of water is relatively not in excess and there is no risk of increasing the mean particle diameter of $Li_xM_yP_wO_4$ provided the concentration of the M element with respect to water is 4 moles/L or more. The concentration of the M element with respect to water in the raw materials is 10.2 moles/L or less and preferably 6.4 moles/L or less. There is no extreme shortage of water and the hydrothermal synthesis reaction can be allowed to proceed smoothly provided the concentration of the M element with respect to water is 10.2 moles/L or less.

Crystalline water of the M element-containing compound is also included in the water. In addition, water may intentionally not be added provided an adequate amount of crystalline water is contained in compounds incorporated as raw materials.

Furthermore, examples of polar solvents other than water that can be hydrothermally synthesized include methanol, ethanol, 2-propanol, ethylene glycol, propylene glycol, acetone, cyclohexanone, 2-methylpyrrolidone, ethyl methyl ketone, 2-ethoxyethanol, propylene carbonate, ethylene carbonate, dimethyl carbonate, dimethylformamide and dimethylsulfoxide. These solvents may be used alone in place of water or these solvents may be used after mixing with water.

Although the aforementioned materials are the main raw materials used in a preferred embodiment of the production method of the present invention, the following substances may also be added in addition to the aforementioned main raw materials.

A reducing substance such as ascorbic acid is a carbon source that can also be used as an antioxidant that prevents oxidation of raw materials during hydrothermal synthesis. Examples of such antioxidants other than ascorbic acid include tocopherol, dibutylhydroxytoluene, butylhydroxyanisole and propyl gallate.

In the production method of a preferred embodiment of the present invention, at least the lithium phosphate and M element-containing compound are subjected to hydrothermal synthesis at a temperature of 100° C. or higher and more preferably to hydrothermal synthesis at a temperature of 100° C. to 300° C. In addition, in the case of adding a phosphoric acid source to the raw materials, heating is started and the reaction is allowed to proceed after having preliminarily mixed the phosphoric acid source with the lithium phosphate to obtain a mixture and then mixing this mixture with the M element-containing compound immediately before starting the reaction. If the phosphoric acid source and M element-containing compound are mixed first and hydrothermal synthesis is started after time is allowed to elapse as a result of further carrying out a different procedure, unexpected side reactions proceed between the phosphoric acid source and the M element-containing compound, thereby making this undesirable.

In preparing the raw materials, the ratio of Li ions, M metal ions and phosphate ions is preferably made to be roughly the same as the stoichiometric ratio of $LiMPO_4$. However, in the case by-products are formed, lithium sources such as lithium contained in by-products are added.

In addition, when preparing the raw materials, the lithium phosphate and M element-containing compound are each preferably crushed in advance so that the particle diameter $D_{90}$ thereof is 100 μm or less. Since the lithium phosphate and M element-containing compound may be unable to be made to each have a particle diameter $D_{90}$ of 100 μm or less if the lithium phosphate and M element-containing compound are crushed after having been mixed, they are preferably crushed prior to mixing. In addition, in the case of crushing, the lithium phosphate and M element-containing compound are preferably crushed in a non-oxidative atmosphere such as that of nitrogen or argon so that they are not oxidized. In addition, the lithium phosphate and M element-containing compound are preferably stored in a non-oxidative atmosphere from the time of crushing until the start of hydrothermal synthesis so that oxidation does not proceed after crushing such as during transport. The mean particle diameter of the $LiMPO_4$ can be reduced by making each particle diameter $D_{90}$ of the lithium phosphate and M element-containing compound to be 100 μm or less.

The reaction for converting to $LiMPO_4$ is initiated and allowed to proceed at a temperature of 100° C. or higher. In addition, the atmosphere within the reaction vessel is preferably replaced with an inert gas or reducing gas. Examples of inert gases include nitrogen and argon.

The resulting suspension is allowed to cool to room temperature followed by solid-liquid separation. Since unreacted lithium ions and the like are contained in the separated liquid, materials such as the Li source can be recovered from the separated liquid.

There are no particular limitations on the recovery method. For example, lithium phosphate can be precipitated by adding a basic phosphoric acid source to the separated liquid. The aforementioned precipitate can be then be recovered and reused as a raw material.

Positive electrode active material separated from the suspension is dried after washing as necessary. Drying conditions are preferably selected such that the metal M is not oxidized. Vacuum drying is preferably used for the aforementioned drying.

In addition, in order to further impart electrical conductivity to the positive electrode active material in the form of $LiMPO_4$, the resulting $LiMPO_4$ is mixed with a carbon source, and the aforementioned mixture is then subjected to vacuum drying as necessary and then fired preferably at a temperature of 500° C. to 800° C. under inert conditions or reductive conditions. As a result of carrying out this firing, a positive electrode material can be obtained in which a carbon material has been formed on the surface of $LiMPO_4$ particles. Firing conditions are preferably selected such that the M element is not oxidized.

Preferable examples of carbon sources able to be used in the aforementioned firing include sugars such as sucrose or lactose, and water-soluble organic substances such as ascorbic acid, 1,6-hexanediol, polyethylene glycol, polyethylene oxide or carboxymethyl cellulose.

The $LiMPO_4$ obtained in this manner is an olivine-type lithium metal phosphate having a composition consisting of $Li_xM_yP_wO_4$. Here, the letters x, y and w representing the molar ratios are such that $0<x<2$, $0<y\leq1.5$ and $0.9<w<1.1$, and M represents one type or two or more types of elements selected from the group consisting of Mg, Ca, Fe, Mn, Ni, Co, Zn, Ge, Cu, Cr, Ti, Sr, Ba, Sc, Y, Al, Ga, In, Si, B and rare earth elements. The composition of $Li_xM_yP_wO_4$ can be adjusted by altering the blending ratio of the lithium phosphate, M element-containing compound, Li source or phosphoric acid source.

(Positive Electrode Active Material for Lithium Secondary Battery)

The positive electrode active material for a lithium secondary battery in a preferred embodiment of the present invention is $LiMPO_4$ produced according to the previously described production method. In this positive electrode active material, the particles of $LiMPO_4$ are more preferably coated with a carbon film.

In addition, in this positive electrode active material, the mean particle diameter $D_{50}$, which is the particle diameter at 50% in the cumulative distribution of particle diameter based on volume, is preferably 0.01 μm to 1 μm and more preferably 0.05 μm to 0.5 μm. In the present embodiment, the mean particle diameter of the positive electrode active material can be controlled as desired by adjusting the concentration of the M element with respect to water.

(Lithium Secondary Battery)

The lithium secondary battery in a preferred embodiment of the present invention is composed by being provided with a positive electrode, a negative electrode and a nonaqueous electrolyte. In this lithium secondary battery, $LiMPO_4$ produced according to the previously described method is used for the positive electrode active material contained in the positive electrode. As a result of being provided with this type of positive electrode active material, the energy density of the lithium secondary battery can be improved. The following sequentially provides explanations of the positive electrode, negative electrode and nonaqueous electrolyte of the lithium secondary battery.

(Positive Electrode)

In the lithium secondary battery in a preferred embodiment of the present invention, a sheet-like electrode composed of a positive electrode mixture, obtained by containing a positive electrode active material, a conductive assistant and a binder, and a positive electrode current collector conjugated to the positive electrode mixture, can be used for the positive electrode. In addition, a pellet-like or sheet-like positive electrode, obtained by molding the aforementioned positive electrode mixture into the shape of a disc, can also be used.

Although lithium metal phosphate produced according to the aforementioned method is used for the positive electrode active material, conventionally known positive electrode active materials may also be mixed with this lithium metal phosphate.

Although the binder can be selected arbitrarily, examples thereof include polyethylene, polypropylene, ethylene-propylene copolymer, ethylene-propylene terpolymer, butadiene rubber, styrene-butadiene rubber, butyl rubber, polytetrafluoroethylene, poly(meth)acrylate, polyvinylidene fluoride, polyethylene oxide, polypropylene oxide, polyepichlorohydrin, polyphosphazene and polyacrylonitrile.

Moreover, although the conductive assistant can also be selected arbitrarily, examples thereof include conductive metal powders such as silver powder, conductive carbon powders such as furnace black, Ketjen black or acetylene black, carbon nanotubes, carbon nanofibers and vapor grown carbon fibers. Vapor grown carbon fibers are preferably used for the conductive assistant. The fiber diameter of the vapor grown carbon fibers is preferably 5 nm to 0.2 µm and more preferably 10 nm to 0.1 µm. The ratio of fiber length to fiber diameter is preferably 5 to 1000 and more preferably 100 to 500. The content of vapor grown carbon fibers based on the dry weight of the positive electrode mixture is preferably 0.1% by weight to 10% by weight and more preferably 0.5% by weight to 5% by weight.

Moreover, although the positive electrode current collector can also be selected arbitrarily, examples thereof include conductive metal foil, conductive metal mesh and perforated conductive metal. Aluminum or aluminum alloy is preferable for the conductive metal. A carbon film may be formed on the positive electrode current collector in order to improve electrical conductivity with the positive electrode mixture.

(Negative Electrode)

A sheet-like electrode composed of a negative electrode mixture, obtained by containing a negative electrode active material, a binder and a conductive assistant added as necessary, and a negative electrode current collector conjugated to the negative electrode mixture, can be used for the negative electrode. In addition, a pellet-like or sheet-like negative electrode, obtained by molding the aforementioned negative electrode mixture into the shape of a disc, can also be used for the negative electrode.

A conventionally known negative electrode active material can be used for the negative electrode active material. Examples of materials that can be used include carbon materials such as synthetic graphite or natural graphite, and metallic or semi-metallic materials such as Sn or Si.

A binder similar to that used in the positive electrode can be used for the binder.

Moreover, a conductive assistant may or may not be added as necessary. Examples of conductive assistants that can be used include conductive carbon powders such as furnace black, Ketjen black or acetylene black, carbon nanotubes, carbon nanofibers and vapor grown carbon fibers. Vapor grown carbon fibers are used particularly preferably for the conductive assistant. The fiber diameter of the vapor grown carbon fibers is preferably 5 nm to 0.2 µm and more preferably 10 nm to 0.1 µm. The ratio of fiber length to fiber diameter is preferably 5 to 1000 and more preferably 100 to 500. The content of vapor grown carbon fibers based on the dry weight of the negative electrode mixture is preferably 0.1% by weight to 10% by weight and more preferably 0.5% by weight to 5% by weight.

Moreover, examples of materials used for the negative electrode current collector include conductive metal foil, conductive metal mesh and perforated conductive metal. Copper or copper alloy is preferable for the conductive metal.

(Nonaqueous Electrolyte)

Next, an example of the nonaqueous electrolyte is a nonaqueous electrolyte obtained by dissolving a lithium salt in an aprotic solvent.

Although the aprotic solvent can be selected arbitrarily, at least one type, or a mixed solvent of two or more types, selected from the group consisting of ethylene carbonate, diethyl carbonate, dimethyl carbonate, methyl ethyl carbonate, propylene carbonate, butylene carbonate, γ-butyrolactone and vinylene carbonate is preferable.

In addition, examples of the lithium salt include $LiClO_4$, $LiPF_6$, $LiAsF_6$, $LiBF_4$, $LiSO_3CF_3$, $CH_3SO_3Li$ and $CF_3SO_3Li$.

In addition, a so-called solid electrolyte or gel electrolyte can also be used for the nonaqueous electrolyte. Examples of solid electrolytes or gel electrolytes include polymer electrolytes such as sulfonated styrene-olefin copolymers, polymer electrolytes using polyethylene oxide and $MgClO_4$, and polymer electrolytes having a trimethylene oxide structure. At least one type selected from the group consisting of ethylene carbonate, diethyl carbonate, dimethyl carbonate, methyl ethyl carbonate, propylene carbonate, butylene carbonate, γ-butyrolactone and vinylene carbonate is preferable for the nonaqueous solvent used in the polymer electrolyte.

Moreover, the lithium secondary battery in a preferred embodiment of the present invention is not limited to that provided with only a positive electrode, negative electrode and nonaqueous electrolyte, but rather may also be provided with other members and the like as necessary. For example, the lithium secondary battery may also be provided with a separator that separates the positive electrode and negative electrode. A separator is required in the case the nonaqueous electrolyte is not a polymer electrolyte. Examples of separators include non-woven fabrics, woven fabrics, microporous films and combinations thereof More specifically, a porous polypropylene film or porous polyethylene film and the like can be used appropriately.

The lithium secondary battery in a preferred embodiment of the present invention can be used in various fields.

Examples thereof include electrical and electronic devices such as personal computers, tablet computers, notebook computers, cellular telephones, wireless transceivers, electronic organizers, electronic dictionaries, personal digital assistants (PDA), electronic meters, electronic keys, electronic tags, power storage devices, power tools, toys, digital cameras, digital video recorders, audio-visual equipment or vacuum cleaners, transportation means such as electric vehicles, hybrid vehicles, electric motorcycles, hybrid motorcycles, motorized bicycles, power-assisted bicycles, trains, aircraft or marine vessels, and electrical power generation systems such as solar power generation systems, wind power generation systems, tidal power generation systems, geothermal power generation systems, temperature difference power generation systems or vibration power generation systems.

As has been previously explained, according to the method for producing a positive electrode active material of a lithium secondary battery in a preferred embodiment of the present invention, the mean particle diameter of $LiMPO_4$ can be further reduced by using lithium phosphate and an M element-containing compound as raw materials and adjusting the concentration of the M element with respect to water to 4 moles/L or more when producing a positive electrode active material for a lithium secondary battery composed of $LiMPO_4$.

EXAMPLES

Example 1

1. Hydrothermal Synthesis Step

First, $MnSO_4 \cdot 5H_2O$ (Kanto Chemical, special grade), $FeSO_4 \cdot 7H_2O$ (Wako Pure Chemical Industries, special grade), $Li_3PO_4$ (Kanto Chemical, Cica reagent) and L(+)-ascorbic acid (Kanto Chemical, special grade) were respectively crushed to a particle diameter $D_{90}$ of 100 μm or less in a safety cabinet filled with argon gas while applying pulses using the MX1200X™ Power Blender and PN-K06 Minute Crushing Cover (Waring).

Next, 0.012 g of the L(+)-ascorbic acid, 15.6 g of the crushed $MnSO_4 \cdot 5H_2O$, 5.83 g of the crushed $FeSO_4 \cdot 7H_2O$ and 10 g of the crushed $Li_3PO_4$ were placed in a 100 ml PTFE sample container followed by adding thereto 10 ml of distilled water expelled of dissolved carbon dioxide gas and oxygen by bubbling with argon gas for 15 hours, covering the container, and placing in a pressure-resistant stainless steel casing (HUS-100).

Next, the pressure-resistant stainless steel casing charged with the hydrothermal synthesis raw materials was placed in an autoclave and the hydrothermal synthesis reaction was allowed to proceed by raising the temperature to 200° C. in a heating time of 1 hour and holding at 200° C. for 7 hours. After holding at that temperature for 7 hours, heating was discontinued followed by allowing to cool to room temperature.

Next, after cooling to room temperature, the reacted suspension was removed from the autoclave and subjected to liquid-solid separation with a centrifuge. A procedure consisting of discarding the resulting supernatant, adding additional distilled water, stirring the solid to redisperse, re-centrifuging the redispersed liquid and discarding the supernatant was repeated until the electrical conductivity of the supernatant became $1 \times 10^{-4}$ S/cm or less. Subsequently, drying was carried out in a vacuum dryer controlled to 90° C. Lithium metal phosphate was obtained in this manner.

2. Carbon Film Formation Step 5.0 g of the resulting dried lithium metal phosphate was weighed out, and after adding 0.5 g of sucrose and further adding 2.5 ml of distilled water, the mixture was dried in a vacuum dryer controlled to 90° C. The dried product was placed in an aluminum boat and placed in a tube furnace equipped with a quartz tube having a diameter of 80 mm for the core. The gaseous sucrose degradation product was discharged outside the system by raising the temperature at the rate of 100° C./hr while introducing nitrogen at a flow rate of 1 L/min and holding at 400° C. for 1 hour. Subsequently, the temperature was raised to 700° C. at the rate of 100° C./hr and held at that temperature for 4 hours while introducing nitrogen. After the 4 hours had elapsed, the fired product was cooled to 100° C. or lower while introducing nitrogen followed by removing from the tube furnace to obtain a positive electrode active material.

3. Battery Evaluation 1.0 g of the positive electrode active material, 0.3 g of a conductive assistant in the form of acetylene black (HS-100, Denki Kagaku Kogyo) and 0.15 g of a binder in the form of polyvinylidene fluoride (KF Polymer W #1300, Kureha) were respectively weighed. After mixing well, 2.25 g of N-methyl-2-pyrrolidone (Kishida Chemical) were gradually added thereto to obtain a coating liquid. This coating liquid was coated onto aluminum foil having a thickness of 20 μm with a doctor blade coater following adjustment of the gap thereof. After drying the N-methyl-2-pyrrolidone from the resulting coated film, a portion of the film was cut out in the shape of a circle having a diameter of 15 mm. Subsequently, when the thickness of the cut out coating film was measured after pressing for 20 seconds at 3 MPa, the average film thickness was determined to be 52 μm. In addition, the weight of the coating film was 11 mg. A positive electrode was produced in this manner.

The resulting positive electrode was introduced into a safety cabinet filled with argon in which the dew point was controlled to −75° C. or lower. The positive electrode was placed on a cover for a type 2320 coin-type battery (Housen) followed by the addition of electrolyte (1 M $LiPF_6$, EC:MEC=40:60). Moreover, a separator cut out to a diameter of 20 mm (Celgard 2400) and lithium metal foil cut out to a diameter of 17.5 mm were sequentially layered thereon. A cap equipped with a gasket was then placed thereon and sealed to produce a coin-type battery having a diameter of 23 mm and thickness of 2 mm.

Example 2

A coin-type battery was produced under the same conditions as Example 1 with the exception of changing the amount of water added to 11 mL.

Example 3

A coin-type battery was produced under the same conditions as Example 1 with the exception of changing the amount of water added to 9 mL.

Example 4

A coin-type battery was produced under the same conditions as Example 1 with the exception of changing the amount of water added to 7 mL.

Example 5

A coin-type battery was produced under the same conditions as Example 1 with the exception of further adding 0.19 g of LiOH.H$_2$O (Kanto Chemical, special grade) crushed to a particle diameter D$_{90}$ of 100 μm or less to the hydrothermal synthesis raw materials.

Example 6

A coin-type battery was produced under the same conditions as Example 5 with the exception of changing the amount of water added to 11 mL.

Example 7

A coin-type battery was produced under the same conditions as Example 5 with the exception of changing the amount of water added to 9 mL.

Example 8

A coin-type battery was produced under the same conditions as Example 5 with the exception of changing the amount of water added to 7 mL.

Example 9

A coin-type battery was produced under the same conditions as Example 1 with the exception of using 5.90 g of CoSO$_4$.7H$_2$O (Kanto Chemical, Cica reagent) instead of FeSO$_4$.7H$_2$O.

Example 10

A coin-type battery was produced under the same conditions as Example 1 with the exception of using 5.52 g of NiSO$_4$.6H$_2$O (Kanto Chemical, Cica reagent) instead of FeSO$_4$.7H$_2$O.

Example 11

A coin-type battery was produced under the same conditions as Example 1 with the exception of changing the temperature during hydrothermal synthesis to 100° C.

Comparative Example 1

A coin-type battery was produced under the same conditions as Example 1 with the exception of carrying out crushing after having first mixed the MnSO$_4$.5H$_2$O, FeSO$_4$.7H$_2$O, Li$_3$PO$_4$ and L(+)-ascorbic acid.

Comparative Example 2

A coin-type battery was produced under the same conditions as Example 1 with the exception of mixing the MnSO$_4$.5H$_2$O FeSO$_4$.7H$_2$O, Li$_3$PO$_4$ and L(+)-ascorbic acid without crushing, and using 10 mL of distilled water.

Comparative Example 3

A coin-type battery was produced under the same conditions as Example 1 with the exception of adding 100 mL of distilled water.

Comparative Example 4

A coin-type battery was produced under the same conditions as Example 1 with the exception of adding 50 mL of distilled water.

Comparative Example 5

A coin-type battery was produced under the same conditions as Example 1 with the exception of adding 30 mL of distilled water.

Comparative Example 6

A coin-type battery was produced under the same conditions as Example 1 with the exception of adding 20 mL of distilled water.

Comparative Example 7

A coin-type battery was produced under the same conditions as Example 5 with the exception of adding 100 mL of distilled water.

Comparative Example 8

A coin-type battery was produced under the same conditions as Example 5 with the exception of adding 50 mL of distilled water.

Comparative Example 9

A coin-type battery was produced under the same conditions as Example 5 with the exception of adding 30 mL of distilled water.

Comparative Example 10

A coin-type battery was produced under the same conditions as Example 5 with the exception of adding 20 mL of distilled water.

Comparative Example 11

A coin-type battery was produced under the same conditions as Example 1 with the exception of changing the temperature of hydrothermal synthesis to 90° C.

(Material Evaluation)

As a result of measuring the positive electrode active materials obtained in Example 1 and Comparative Example 2 by X-ray diffraction using CuKα radiation (X'Pert Powder, PANalytical), a single phase of LiFe$_{0.25}$Mn$_{0.75}$PO$_4$ was confirmed to have been formed in Example 1. On the other hand, an impurity phase was observed in Comparative Example 2. This is thought to be the result of the failure of a homogeneous reaction to occur due to not crushing the charged materials. The diffraction lines (2θ) of LiFePO$_4$ and LiMnPO$_4$ are shown at the bottom of FIG. 1. In addition, composition was determined according to Vegard's law.

Figure 2:
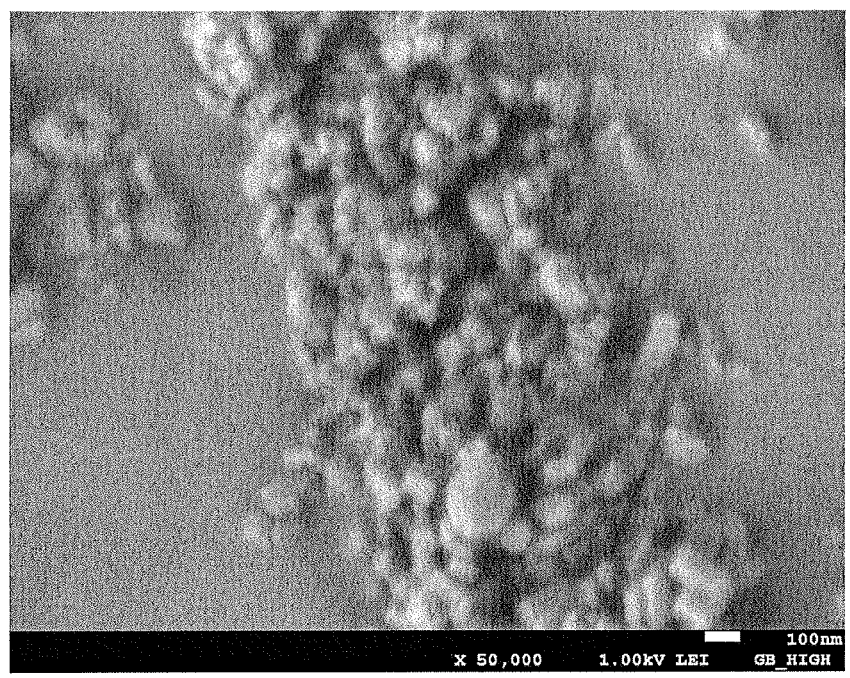
FIG. 2 is an SEM micrograph of a positive electrode active material of Example 1.
Figure 3:
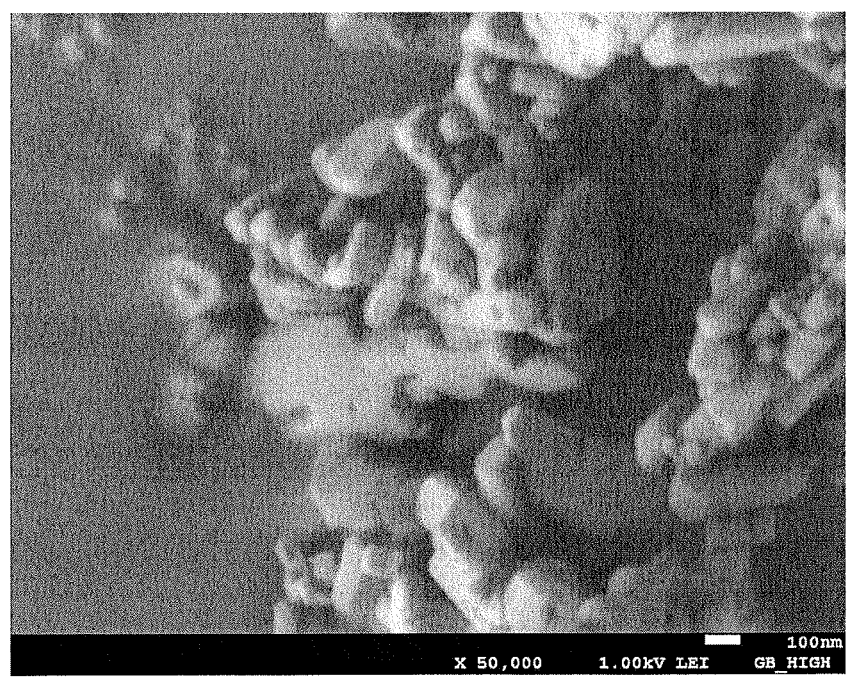
FIG. 3 is an SEM micrograph of a positive electrode active material of Comparative Example 3.

In addition, scanning electron micrographs (SEM) of the positive electrode active materials obtained in Example 1 and Comparative Example 3 are respectively shown in FIGS. 2 and 3. According to FIGS. 2 and 3, the active material of Example 1 has a smaller particle diameter than that of Comparative Example 3. This is thought to be the result of the total concentration of metal atoms in Example 1 of about 4.7 moles/L being higher than the value of about 0.8 moles/L in Comparative Example 3.

Particle size distribution of the positive electrode active materials was measured while dispersed by ultrasonic waves in isopropyl alcohol (IPA) using the LMS-2000e Laser Diffraction Scattering Particle Size Distribution Analyzer and 2000S/SR Dispersion Unit (Seishin Enterprise). The results of measuring mean particle diameter $D_{50}$ are shown in Table 1.

(Battery Evaluation)

The coin-type batteries of Examples 1 to 11 and Comparative Examples 1 to 11 were constant-current charged to 4.5 V at a temperature of 25° C. and current value of 0.1 C followed by constant-voltage charging at 4.5 V until the current value reached 0.01 C. Subsequently, the batteries were constant-voltage discharged to 2.5 V at 2 C and 0.1 C. The discharge capacities and discharge capacity retention ratios at 0.1 C are shown in the following Table 1. Discharge capacity is the discharge capacity per weight of the positive electrode active material. In addition, discharge capacity retention ratio is the percentage of the discharge capacity during discharge at 2 C versus discharge capacity during discharge at 0.1 C.

According to the results, Examples 1 to 10 were confirmed to demonstrate favorable rate characteristics. This is thought to be the result of having obtained finely particulate $LiMPO_4$ due to having been synthesized at a high concentration. Although capacity and rate characteristics in Example 5 improved slightly over those of Example 1, this can be said to be due to the excess amount of Li contained therein. Although capacity and rate characteristics in Comparative Example 1 were slightly inferior to those of Example 1, this is thought to be the result of the occurrence of a slight oxidation reaction of the metal species due to the charged materials having been crushed with other raw materials. Although capacity and rate characteristics in Comparative Example 2 were inferior to those of Example 1, this can be said to be due to the presence of impurities. Although capacity in Comparative Example 3 was equal to that of Example 1, rate characteristics were inferior. This can be said to be due to the difference in particle diameter as can also be understood from FIG. 2.

As is clear from Comparative Examples 3 to 6 and Examples 1 to 3, particle diameter can be understood to decrease as the concentration of the M element increases with respect to water. In addition, as is clear from Examples 1 to 4, it can be understood that when the concentration of M element with respect to water is 4.5 mol/L or more, particle diameter is 200 nm or less and discharge capacity retention ratio can be maintained at 85% or higher. Particle diameter was the smallest at a concentration of 4.9 moles/L in particular.

As shown in Examples 5 to 8, results similar to those of Examples 1 to 4 are obtained even in the case of compositions having an excess of Li.

Moreover, as shown in Examples 9 and 10, metals such as Co or Ni can be similarly applied for the M source.

In addition, as shown in Example 11 and Comparative Example 11, the reaction temperature can be understood to preferably be 100° C. or higher.

TABLE 1

| | M element concentration vs. water (moles/L) | Particle diameter D90 (μm) | | | $LiMPO_4$ composition ratio | $LiMPO_4$ mean particle diameter $D_{50}$ (μm) | $LiMPO_4$ yield (%) | Discharge capacity (mAh/g) | Discharge capacity retention ratio (%) |
|---|---|---|---|---|---|---|---|---|---|
| | | $Li_3PO_4$ | M source | LiOH | | | | | |
| Ex. 1 | 4.7 | 82 | 93 | 92 | $LiFe_{0.25}Mn_{0.75}PO_4$ | 152 | 99 | 145.6 | 88.2 |
| Ex. 2 | 4.4 | 82 | 93 | 92 | $LiFe_{0.25}Mn_{0.75}PO_4$ | 167 | 99 | 145.1 | 86.1 |
| Ex. 3 | 4.9 | 82 | 93 | 92 | $LiFe_{0.25}Mn_{0.75}PO_4$ | 121 | 99 | 149.6 | 90.1 |
| Ex. 4 | 5.6 | 82 | 93 | 92 | $LiFe_{0.25}Mn_{0.75}PO_4$ | 161 | 99 | 145.5 | 86.4 |
| Ex. 5 | 4.7 | 82 | 93 | 92 | $Li_{1.05}Fe_{0.25}Mn_{0.75}PO_4$ | 143 | 99 | 147.1 | 89.1 |
| Ex. 6 | 4.4 | 82 | 93 | 92 | $Li_{1.05}Fe_{0.25}Mn_{0.75}PO_4$ | 151 | 99 | 147 | 88.8 |
| Ex. 7 | 4.9 | 82 | 93 | 92 | $Li_{1.05}Fe_{0.25}Mn_{0.75}PO_4$ | 117 | 99 | 150.1 | 90.3 |
| Ex. 8 | 5.6 | 82 | 93 | 92 | $Li_{1.05}Fe_{0.25}Mn_{0.75}PO_4$ | 158 | 99 | 147.9 | 86.9 |
| Ex. 9 | 4.7 | 82 | 93 | 92 | $LiCo_{0.25}Mn_{0.75}PO_4$ | 172 | 99 | 137.6 | 91.2 |
| Ex. 10 | 4.7 | 82 | 93 | 92 | $LiNi_{0.25}Mn_{0.75}PO_4$ | 181 | 99 | 135.6 | 92.2 |
| Ex. 11 | 4.7 | 82 | 93 | 92 | $Li_{0.98}Fe_{0.22}Mn_{0.78}PO_4$ | 325 | 96 | 123.8 | 67.5 |
| Comp. Ex. 1 | 4.7 | — | — | — | $Li_{0.98}Fe_{0.22}Mn_{0.78}PO_4$ | 161 | 97 | 135.3 | 75.2 |
| Comp. Ex. 2 | 4.7 | ≥1000 | ≥1000 | ≥1000 | $Li_{0.97}Fe_{0.28}Mn_{0.72}PO_4$ | 342 | 63 | 122.6 | 66.1 |
| Comp. Ex. 3 | 0.8 | 82 | 93 | 92 | $LiFe_{0.25}Mn_{0.75}PO_4$ | 261 | 98 | 138.4 | 72.3 |
| Comp. Ex. 4 | 1.8 | 82 | 93 | 92 | $LiFe_{0.25}Mn_{0.75}PO_4$ | 232 | 98 | 140.2 | 73.5 |
| Comp. Ex. 5 | 2.2 | 82 | 93 | 92 | $LiFe_{0.25}Mn_{0.75}PO_4$ | 221 | 98 | 142.8 | 74.4 |
| Comp. Ex. 6 | 3 | 82 | 93 | 92 | $LiFe_{0.25}Mn_{0.75}PO_4$ | 215 | 98 | 144.2 | 74.5 |
| Comp. Ex. 7 | 0.8 | 82 | 93 | 92 | $Li_{1.05}Fe_{0.25}Mn_{0.75}PO_4$ | 252 | 98 | 140.1 | 72.9 |
| Comp. Ex. 8 | 1.8 | 82 | 93 | 92 | $Li_{1.05}Fe_{0.25}Mn_{0.75}PO_4$ | 222 | 98 | 143.3 | 73.6 |
| Comp. Ex. 9 | 2.2 | 82 | 93 | 92 | $Li_{1.05}Fe_{0.25}Mn_{0.75}PO_4$ | 218 | 98 | 144.7 | 74.8 |
| Comp. Ex. 10 | 3 | 82 | 93 | 92 | $Li_{1.05}Fe_{0.25}Mn_{0.75}PO_4$ | 212 | 98 | 145.5 | 74.9 |
| Comp. Ex. 11 | 4.7 | 82 | 93 | 92 | $Li_{1.05}Fe_{0.25}Mn_{0.75}PO_4$ | 366 | 32 | 97.5 | 58.1 |

INDUSTRIAL APPLICABILITY

According to the method for producing a positive electrode active material for a lithium secondary battery of the present invention, $LiMPO_4$ having a small particle diameter can be easily obtained.

The invention claimed is:

1. A method for producing a positive electrode active material for a lithium secondary battery, comprising: mixing lithium phosphate having a particle diameter $D_{90}$ of 100 μm or less prior to mixing, an M element-containing compound having a particle diameter $D_{90}$ of 100 μm or less prior to mixing, where, M is one type or two or more types of elements selected from the group consisting of Mg, Ca, Fe, Mn, Ni, Co, Zn, Ge, Cu, Cr, Ti, Sr, Ba, Sc, Y, Al, Ga, In, Si, B and rare earth elements, and water, adjusting the concentration of the M element with respect to water to 4 moles/L or more to obtain a raw material, and producing olivine-type $LiMPO_4$ by carrying out hydrothermal synthesis using the raw material.

2. The method for producing a positive electrode active material for a lithium secondary battery according to claim 1, wherein the concentration of the M element with respect to water in the raw material is 4 moles/L to 10.2 moles/L.

3. The method for producing a positive electrode active material for a lithium secondary battery according to claim 1, wherein the M element-containing compound is one type or two or more types of a sulfate, halide salt, nitrate, phosphate or organic salt of the M element.

4. The method for producing a positive electrode active material for a lithium secondary battery according to claim 1, wherein one type or two or more types selected from the group consisting of LiOH, $Li_2CO_3$, $CH_3COOLi$ and $(COOLi)_2$ are further mixed in as a lithium source.

5. The method for producing a positive electrode active material for a lithium secondary battery according to claim 1, wherein one or more types selected from the group consisting of phosphoric acid, metaphosphoric acid, pyrophosphoric acid, triphosphoric acid, tetraphosphoric acid, hydrogen phosphate, dihydrogen phosphate, ammonium phosphate, anhydrous ammonium phosphate, ammonium dihydrogen phosphate, diammonium hydrogen phosphate and iron phosphate is added as a phosphoric acid source.

6. The method for producing a positive electrode active material for a lithium secondary battery according to claim 1, wherein the lithium phosphate and the M element-containing compound are mixed after respectively adjusting to a particle diameter $D_{90}$ of 100 μm or less in an inert gas atmosphere.

7. The method for producing a positive electrode active material for a lithium secondary battery according to claim 1, wherein the reaction temperature of hydrothermal synthesis is 100° C. or higher.

8. A method for producing a positive electrode active material for a lithium secondary battery, comprising: mixing a carbon source with the $LiMPO_4$ obtained according to the production methods according to claim 1 and heating in an inert gas atmosphere or reducing gas atmosphere to form a carbon material on the surface of the $LiMPO_4$.

9. The method for producing a positive electrode active material for a lithium secondary battery according to claim 8, wherein one or more types of sucrose, lactose, ascorbic acid, 1,6-hexanediol, polyethylene glycol, polyethylene oxide, carboxymethyl cellulose, carbon black and filamentous carbon are used as the carbon source.

10. The method for producing a positive electrode active material for a lithium secondary battery according to claim 1, comprising a step for further mixing the resulting $LiMPO_4$ with a carbon source and firing at a temperature of 500° C. to 800° C.

11. The method for producing a positive electrode active material for a lithium secondary battery according to claim 1, wherein a powder having a particle diameter $D_{90}$ or 60 μm or less is used for the M element-containing compound.

12. The method for producing a positive electrode active material for a lithium secondary battery according to claim 1, wherein a powder having a particle diameter $D_{90}$ or 45 μm or less is used for the M element-containing compound.

13. The method for producing a positive electrode active material for a lithium secondary battery according to claim 1, wherein the $LiMPO_4$ is an olivine-type lithium metal phosphate having a composition consisting of $Li_xM_yP_wO_4$, and the letters x, y and w representing the molar ratios are such that $0<x<2$, $0<y\leq1.5$ and $0.9<w<1.1$.

14. The method for producing a positive electrode active material for a lithium secondary battery according to claim 13, wherein the mean particle diameter $D_{50}$ of the $LiMPO_4$ is 0.01 μm to 1 μm.

15. The method for producing a positive electrode active material for a lithium secondary battery according to claim 13, wherein the mean particle diameter $D_{50}$ of the $LiMPO_4$ is 0.05 μm to 0.5 μm.

* * * * *